United States Patent [19]

Uffner et al.

[11] 4,426,419
[45] Jan. 17, 1984

[54] PRESSURE SENSITIVE ADHESIVES BASED ON ASPHALT FLUX

[75] Inventors: William E. Uffner, Newark; Robert N. White, Etna, both of Ohio

[73] Assignee: Owens-Corning Fiberglas Corporation, Toledo, Ohio

[21] Appl. No.: 407,395

[22] Filed: Aug. 12, 1982

[51] Int. Cl.³ .................................................. C08L 95/00
[52] U.S. Cl. ...................................... 428/290; 428/291; 428/355; 428/466; 428/489; 525/54.5; 524/68; 524/71
[58] Field of Search .............. 428/489, 290, 466, 291, 428/355; 524/68, 71; 525/54.5

[56] References Cited

U.S. PATENT DOCUMENTS

| | | | |
|---|---|---|---|
| 2,578,001 | 12/1951 | Cubberley et al. | 260/758 |
| 2,610,162 | 9/1952 | Hoffman | 524/511 |
| 2,884,400 | 4/1959 | Moore | 524/519 |
| 3,338,849 | 8/1967 | Johnson | 524/68 |
| 3,741,856 | 6/1973 | Hurst | 428/246 |
| 3,900,102 | 8/1975 | Hurst | 428/189 |
| 3,919,148 | 11/1975 | Winters et al. | 260/718 |
| 3,932,341 | 1/1976 | Kutch et al. | |
| 4,008,095 | 2/1977 | Fukushima et al. | 524/68 |
| 4,021,393 | 5/1977 | McDonald | 106/273 R |
| 4,064,082 | 12/1977 | Henschel | 524/62 |
| 4,074,948 | 2/1978 | Heater | 404/75 |
| 4,105,612 | 8/1978 | Cushman et al. | 524/62 |
| 4,113,799 | 9/1978 | Ornum et al. | 525/99 |
| 4,169,822 | 10/1979 | Kutch et al. | 525/92 |
| 4,174,992 | 11/1979 | Fujii et al. | 428/325 |
| 4,175,978 | 11/1979 | Marzocchi et al. | 524/68 |
| 4,196,115 | 4/1980 | Bresson | 524/68 |
| 4,217,259 | 8/1980 | Bresson | 524/66 |
| 4,273,685 | 6/1981 | Marzocchi et al. | 523/217 |
| 4,332,705 | 6/1982 | Uffner | 428/489 |
| 4,347,171 | 8/1982 | Uffner | 524/71 |
| 4,362,586 | 12/1982 | Uffner et al. | 428/489 |

OTHER PUBLICATIONS

Owens/Corning Fiberglas "Roadglas–Spot Repair System" Sep. 1981.

*Primary Examiner*—Melvyn I. Marquis
*Assistant Examiner*—Herbert J. Lilling
*Attorney, Agent, or Firm*—Ronald C. Hudgens; Robert F. Rywalski

[57] ABSTRACT

Thermally insensitive adhesives having good adhesion to cementitious substrates and having good low temperature flexural strengths, which consists essentially of the reaction product of asphalt flux, a polymerizable vinyl aromatic monomer, a non-depolymerized rubber, a depolymerized rubber and a terpene resin are provided. These adhesives are outstandingly adapted for use as the adhesives for preformed membranes of the type which comprise an asphaltic coated fibrous reinforcement material having an asphalt based pressure sensitive adhesive on one side thereof.

4 Claims, No Drawings

PRESSURE SENSITIVE ADHESIVES BASED ON ASPHALT FLUX

CROSS REFERENCES

The present application is related to copending application U.S. Ser. No. 359,328 and 360,729, both of which are hereby incorporated by reference.

TECHNICAL FIELD

The present invention relates to chemically modified asphalt compositions and, more specifically, rubber modified asphalt compositions. The present invention also relates to the formation of asphaltic membranes in the form of a laminate for use in highway repair and maintenance.

BACKGROUND AND SUMMARY

Membranes are known which include a reinforcement having an asphaltic based coating thereon and including a pressure sensitive adhesive on one side thereof. U.S. Pat. Nos. 3,741,856 and 3,900,102 exemplified such membranes.

The above incorporated copending applications also disclose such membranes in the form of a laminate comprising a membrane of a coated fibrous reinforcement material having an adhesive layer on one side thereof. The asphaltic based coating is a substantially non-tacky reaction product of asphalt, a polymerizable vinyl aromatic monomer, a non-depolymerized rubber, a terpene resin and depolymerized rubber, i.e., rubber which has been treated with a depolymerizing agent to decrease its molecular weight. While such laminates have many outstanding properties making them well adapted for use in the highway repair and maintenance industries, including both highway and road repair, driveway repair, parking lot repair and maintenance, airport runway repair and maintenance, and the repair and maintenance of like vehicular supporting structures, these laminates, and, more specifically, the adhesive, need to be improved with respect to their low temperature flexural strength properties and thermal sensitivity. Adhesives, which have been employed in the above laminates and which have been manufactured from AC-20 paving grade asphalt, exhibit flexural strength characteristics down to on the order of about 15°–17° F. AC-20 paving grade asphalt has a penetration of about 40 to about 60 or 65 and has a viscosity at 200° F. of about 4000 cps, or higher, and a viscosity at 325° F. of in excess of 100 cps and most typically about 110–112 cps. As is disclosed in the incorporated applications, the adhesives are heated and applied to one side of the asphaltic coated reinforcement as a hot melt. It has been noted that such heated adhesives, when held in a molten condition for prolonged time periods, develop the formation of relatively hard, small granules, i.e., they are thermally sensitive. This thermal sensitivity which results in hard granule formation impairs the efficiency and economy of manufacturing such laminates.

Consequently, there is a need to provide for improved laminates and, more specifically, for improved adhesives which have superior low temperature flexural strengths, that is, satisfactory flexural strengths at lower temperatures and which are thermally insensitive and will not form undesirable hard granules when being held in a melt stage for prolonged time intervals. In accordance with the present invention, such improved adhesives, as well as improved laminates, are provided for use in the repair and maintenance of vehicular supporting structures. The invention resides in a composition which is thermally insensitive, has good adhesion to cementitious substrates, such as, for example, asphalt and concrete substrates, and has good low temperature flexural strengths, that is, good flexural strengths down to temperatures on the order of less than about 0° F. and generally about 0° F. to about −2° F. The adhesive consists essentially of the reaction product of an asphalt flux, a polymerizable vinyl aromatic monomer, a non-depolymerized rubber which is a homopolymer of a conjugated diene or a copolymer of a conjugated diene and at least one ethylenic monomer copolymerizable therewith, a terpene resin and a depolymerized rubber, i.e., a rubber which has been treated with a depolymerizing agent to decrease its molecular weight.

DESCRIPTION

The present adhesives are manufactured by reacting the asphalt flux, a non-depolymerized rubber, which is a homopolymer of a conjugated diene or a copolymer of a conjugated diene and at least one ethylenic monomer copolymerizable therewith, a terpene resin and depolymerized rubber at a temperature and for a time sufficient to promote reaction. Preferably, the reaction will be done by heating at a temperature of at least about 300° F. but at a temperature below the thermal degradation temperature of the non-depolymerized rubber. As will be appreciated by those skilled in the art, the time of reaction is somewhat dependent on the reaction temperature with higher temperatures favoring a more rapid rate of reaction. Desirably, the reaction is carried out by heating at a temperature of about 325° F. or 330° F. to about 380° F. for a period of at least about 16, preferably about 18, hours to 24 hours; reaction times of about 20 hours are preferred. While the proportion of ingredients may vary depending on a specific application, generally the asphalt flux will be employed in an amount of about 47 to about 57 weight percent, the vinyl aromatic monomer in an amount of about 6 to about 11 weight percent, the depolymerized rubber in amount of about 8 to about 15 percent, the non-depolymerized rubber in an amount of about 8 to about 14 percent and the terpene resin in an amount of about 15 to about 22 percent. Outstanding adhesives are produced by employing the asphalt flux in an amount of about 50 to about 54 percent, the vinyl aromatic monomer in an amount of 9 to about 10 percent, the depolymerized rubber in the amount of about 10 to about 11 percent, the non-depolymerized rubber in an amount of about 9.5 to about 10.5 percent and the terpene resin in an amount of 17 to about 19 percent.

The asphalt flux employed in the present invention are reduced crude oils and vacuum residues produced in refinery operations, i.e. the unblown residues of refining towers, either vacuum or gravity, which have softening points of about 38° C. to about 44° C., penetrations of about 155 to about 200 (0.1 mm) with a viscosity of about 380 cps to about 440 cps at 200° F. and a viscosity of about 50 cps to about 85 cps at 325° F.

The polymerizable vinyl aromatic monomer preferably will be one of the general formula $(R_1)(R_2)C=C(R_2)(R_3)$, wherein $R_1$ is an aromatic group containing six to 12 carbon atoms, including a phenyl group, a substituted phenyl group, wherein the substituent is any one of a cyano group, a halogen group, a $C_1$ to $C_3$ alkyl group, a hydroxy group, a nitro group, etc. $R_2$ is preferably hydrogen or a lower alkyl, e.g., a $C_1$ to $C_5$ alkyl such as methyl and $R_3$ is hydrogen or such lower alkyl.

In addition to the above type vinyl aromatic monomers, use can also be made by employing, in addition thereto, a polyfunctional vinyl aromatic monomer of the formula $CH_2=C(H)(R_4)C(R_5)=C(H)(R_6)$ wherein $R_4$ is a divalent aromatic group containing six to twelve carbon atoms and preferably a phenylene group and $R_5$ and $R_6$ have the same meaning as described above with respect to $R_2$ and $R_3$. Such polyfunctional vinyl aromatics enhance the reaction rate. Illustrative of a preferred polyfunctional vinyl aromatic monomer is divinylbenzene. When use is made of a polyfunctional vinyl aromatic monomer in combination with the above described vinyl aromatic monomers, such as styrene, generally, the polyfunctional vinyl aromatic monomer will be present in an amount of about 2% to about 5% by weight based on the weight of the above vinyl aromatic monomer of the formula $(R_1)(R_2)C=C(R_2)(R_3)$.

As the non-depolymerized rubber, or elastomeric polymer, use can be made of a number of elastomeric materials which are homopolymers of a conjugated diene (for example, butadiene isoprene, chloroprene) and more generally, a conjugated diene having about 4 to 6 carbon atoms, or a copolymer of such conjugated dienes with at least one ethylenic monomer copolymerizable therewith, such as, for example, styrene, acrylonitrile, methacrylonitrile. Such non-depolymerized polymers are widely available commercially with the preferred polymers being a copolymer of styrene and butadiene such as that marketed by Phillips Petroleum as their Solprene 1205C. When copolymers are employed, it is preferred that the amount of conjugated diene and, more accurately, the residual conjugated diene of the copolymer be present in a major amount.

Depolymerized rubber, used herein, is intended to include and refer to a number of commercially available low molecular weight natural and synthetic rubber polymers. Depolymerized rubber generally refers to a virgin natural or virgin synthetic rubber (i.e., one which has not been previously vulcanized) and which as been depolymerized to decrease its molecular weight by treatment with a depolymerizing agent, for example, with alkali. It also includes depolymerized synthetic rubbers and, particularly, depolymerized synthetic conjugated diene polymers such as depolymerized synthetic polyisoprene, depolymerized synthetic polybutadiene and depolymerized synthetic polychloroprene. Generally, the depolymerized rubbers employed in the practice of this invention have average molecular weights ranging from about 10,000 to 110,000, and desirably about 30,000 to about 80,000. Various depolymerized rubbers are available from Hardman, Inc. under the trademark "Isolene", a series of liquid depolymerized virgin synthetic polyisoprene polymers and "DPR", a series of liquid, depolymerized virgin (or unvulcanized) natural rubbers. Chemically, such polymers essentially are cis-1,4-polyisoprene having low molecular weights and Brookfield (RVT) viscosities ranging from about 30,000 to about 50,000 CPS at 100° F. Especially preferred is DPR 400, which has a viscosity of 300,000 to 500,000 cps at 38° C. (100° F.).

As the terpene resin, use can be made of a number of synthetic polyterpene resins commercially available. One such resin is marketed by Goodyear Chemicals under the trademark "Wingtack", including the Wingtack 95 resin, which is a synthetic polyterpene derived from $C_5$ hydrocarbon resins. Another Wingtack resin useful in the practice of this invention is Wingtack 115, a resin commercially similar to Wingtack 95 resin except that Wingtack 115 resin has been polymerized to a higher softening point. Another suitable terpene resin are the resins manufactured by Hercules, Inc. under the trademark "Piccolite" resins, including the A-100, A-115, A-125, A-135 resin. Those resins are all derived from the monomer alpha-pinene. They have melt viscosities ranging from about 185° to about 220° C. at one poise. A preferred commercially available terpene resin is Nevpene 9500 available from Nevelle Chemical Company.

As indicated previously, one of the outstanding uses for the present adhesives is in forming laminates for use in the repair and maintenance of vehicular supporting structures. Such laminates are prepared by coating a fibrous reinforcement material with an asphaltic composition which is substantially non-tacky, that is, is not substantially a pressure sensitive adhesive, to form a coated fibrous reinforcement membrane; one side of that membrane is then coated with the adhesive compositions of this invention. A preferred asphaltic composition for use as the non-tacky coating is the reaction product of asphalt, preferably a paving grade asphalt, for example, AC-20 asphalt, a vinyl aromatic monomer, preferably styrene, and a rubbery polymer, preferably a copolymer of butadiene and styrene. In general, any of the vinyl aromatic monomers discussed for purposes of use in the present invention and the non-depolymerized rubbers discussed above for the present invention will be suitable in forming such an asphaltic coating composition. Another suitable asphaltic coating is that described in co-pending application U.S. Ser. No. 407,390. In forming such laminates for use in highway repair and maintenance areas, it is preferred to protect the adhesive layer of the laminates and prevent membrane adherence, when in a rolled up form, prior to time of use by covering the adhesive with a suitable removable or releasable skin in the form of a releasable paper. Additionally, if desired, the asphaltic coating forming the substantially non-tacky portion of the laminate may be dusted lightly with, for example, limestone or talc to further prevent adhesion when in rolled up form. Exemplary fibrous reinforcement materials are various mats including chopped strand mats, continuous strand mats, swirl mats, woven and non-woven fabrics, for example, woven rovings, insect screening, scrim and the like. Preferably, the fibrous materials are glass, but they may also be organic polymeric materials or combinations of glass and organic polymers. The preferred reinforcement is a woven glass roving. For further details with respect to formation of such laminates, reference may be had to the aforeincorporated pending applications.

While the foregoing describes the present invention with sufficient particularity to enable those skilled in the art to make and use same, nonetheless, there follows a non-limiting example thereof.

EXAMPLE

A pressure-sensitive-chemically-modified adhesive was prepared from a batch of about 585 parts by weight of asphalt flux (viscosity about 410 cps at 200° F., 225 cps at 260° F., 65 cps at 325° F. and a penetration of about 194), about 104 parts by weight of styrene monomer, about 111 parts by weight of Solprene 1205C styrene butadiene copolymer, about 200 parts by weight of Nevpene, 9500 terpene resin and about 120 parts by weight of DPR-400 depolymerized natural rubber. The batch was prepared in a reactor equipped with an agitator and a reflux condenser by heating at about 165° C. for about 20 hours. The pressure sensitive adhesive showed good adhesion to cementitious substrates, namely to Portland Cement and asphaltic cement substrates. Additionally, it showed satisfactory flexural strength by exhibiting substantially no crazing or cracking when flexed at temperatures of about 0° F., and generally, at temperatures in the range of 0° to about −2° F. Additionally, when held for prolonged periods of time and applied as the adhesive to an asphaltic coated fibrous reinforcement, no hard granule formation occurred, thereby indicating its thermal insensitivity. In contrast, when adhesives are prepared employing AC-20 paving grade asphalt generally in the range of about 46 to about 47 percent by weight and using the above indicated depolymerized natural rubber in an amount varying between about 7 to about 10 percent by weight, styrene in an amount of about 7 to about $7\frac{1}{2}$ percent by weight, the above indicated styrene-butadiene rubber in an amount of about $9\frac{1}{2}$ to 10 percent by weight and the above terpene resin in an amount of about 27 to 28 percent by weight, it was observed that comparable flexural strength was only good to about 15°–17° F., and these compositions exhibited thermal sensitivity problems after being heated for prolonged periods as determined by the presence of hard granules.

Thus, it will be appreciated that, when using the present pressure sensitive adhesives to coat one side of a membrane comprised of an asphaltic coated fibrous reinforcement, efficiency of operation and product quality are greatly enhanced because of the thermal insensitivity of the composition. Additionally, in using such laminate for highway repair and maintenance, e.g., to control reflective cracking, the laminate, because of the improved flexural strength of the adhesive, will be capable of withstanding lower temperatures.

While the above describes the present invention, it will, of course, be apparent that modifications are possible which, pursuant to the patent statutes and laws, do not depart from the spirit and scope thereof.

We claim:

1. A thermally-insensitive, pressure-sensitive adhesive having good adhesion to cementitious substrates consisting essentially of the reaction product of asphalt flux having a softening point of about 38° C. to about 44° C., a penetration of about 155 to about 200, a viscosity at 200° F. of about 380 cps to about 440 cps and a viscosity at 325° F. of about 50 cps to about 85 cps, a polymerizable vinyl aromatic monomer, a non-depolymerized rubber which is a homopolymer of a conjugated diene or a copolymer of a conjugated diene and at least one ethylenic monomer copolymerizable therewith, a terpene resin, and unvulcanized rubber which has been treated with a depolymerizing agent to decrease its molecular weight.

2. The adhesive of claim 1 wherein said monomer is styrene, said non-depolymerized rubber is a copolymer of styrene and butadiene, and the rubber which has been treated with a depolymerizing agent, is natural rubber which has been so treated.

3. In a laminate comprising a coated fibrous reinforcement material having an asphaltic based pressure sensitive adhesive on one side thereof, the improvement wherein said adhesive is the adhesive of claim 1.

4. The improvement of claim 3 wherein said monomer is styrene, and said non-depolymerized rubber is a copolymer of styrene and butadiene.

* * * * *